March 4, 1930.                H. A. DENMIRE                1,749,420
                              COLLAPSIBLE CORE
                           Filed March 5, 1928            2 Sheets-Sheet 1

INVENTOR
Harold A. Denmire
BY Evans & McCoy
ATTORNEYS

March 4, 1930.  H. A. DENMIRE  1,749,420
COLLAPSIBLE CORE
Filed March 5, 1928  2 Sheets-Sheet 2

INVENTOR
Harold A. Denmire
BY Evans & McCoy
ATTORNEYS

Patented Mar. 4, 1930

1,749,420

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

COLLAPSIBLE CORE

Application filed March 5, 1928. Serial No. 259,237.

This invention relates to collapsible tire building cores and has for its object to provide a collapsible core from which a tire casing may be easily removed.

Collapsible cores are commonly used in the building of pneumatic tire casings and these cores consist of arcuate sections mounted for radial movement on a common supporting shaft. The sections in their outermost positions abut end to end and the core commonly consists of a pair of relatively short key sections and a pair of longer main sections between which the key sections fit. In order to permit collapse of the main sections, the key sections in machines as heretofore constructed have been mounted to slide on the shaft so that they may be collapsed and then drawn outwardly along the supporting shaft to a position clear of the main sections to permit the main sections to be collapsed and, after the collapse of the main sections, the tire is taken off by gradually working it off the main sections and over the key sections positioned between the main sections and the end of the supporting shaft. Considerable labor is involved in the removal of the tire from the core due to the fact that the tire has to be manipulated to get it over the collapsed key sections.

The present invention contemplates the use of a collapsible core structure similar to that heretofore employed but mounted in such a manner that when the core is fully collapsed for the removal of a tire, the key sections instead of being positioned upon the outer side of the main core sections are positioned upon the inner side thereof so that the casing may be removed directly from the main core sections and over the end of the supporting shaft.

With the above and other objects in view, the invention may be said to comprise the collapsible tire building core as illustrated in the accompanying drawings hereinafter described and particularly set forth in the appended claims together with such variations and modifications thereof as will be apparent to one skilled in the art to which the invention appertains.

Reference should be had to the accompanying drawings forming a part of the specification in which Figure 1 is a front elevation showing the collapsible core in tire receiving position.

Figure 1:
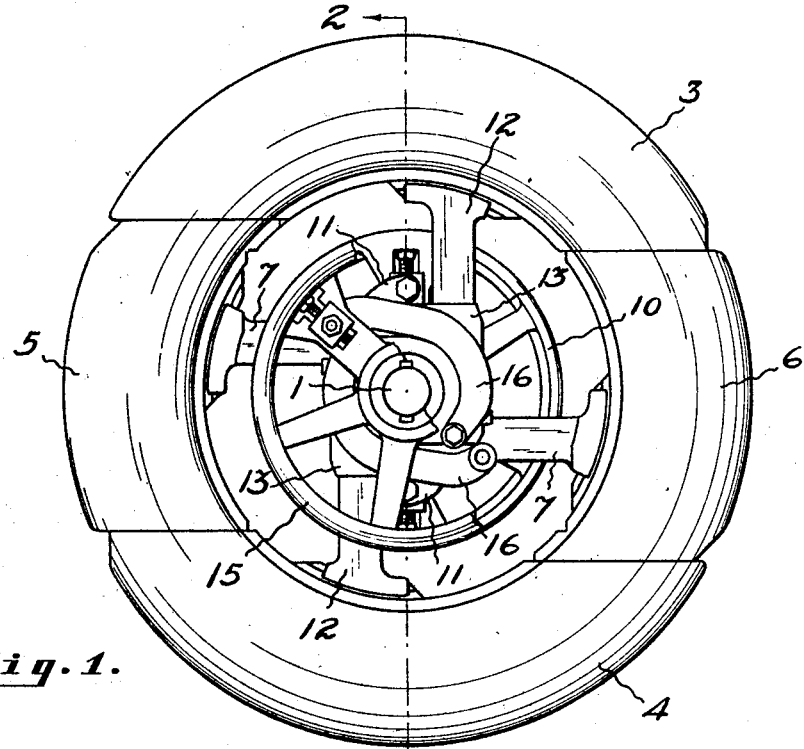
Figure 2:
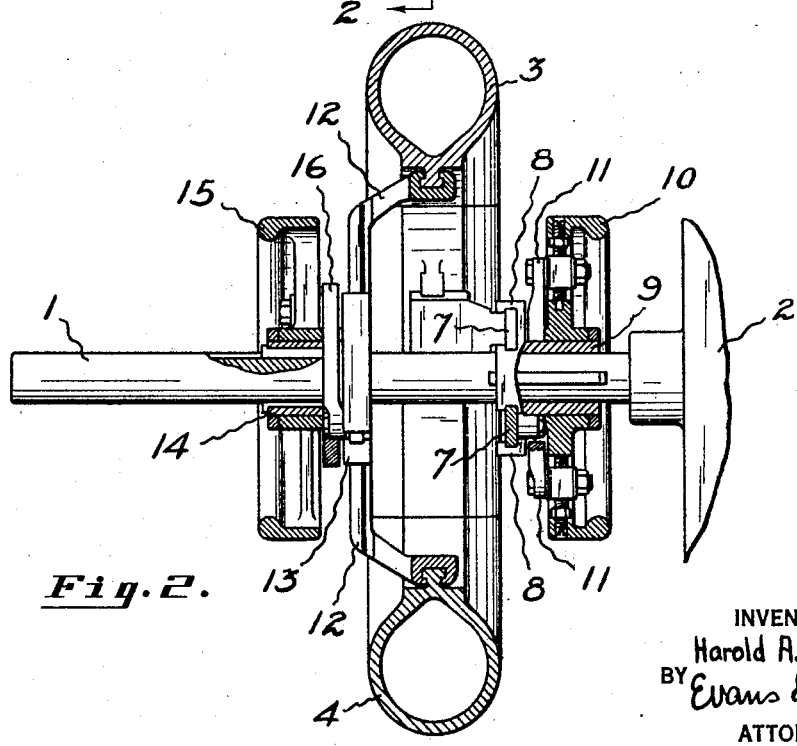
Fig. 2 is an axial section through the core.
Figure 3:
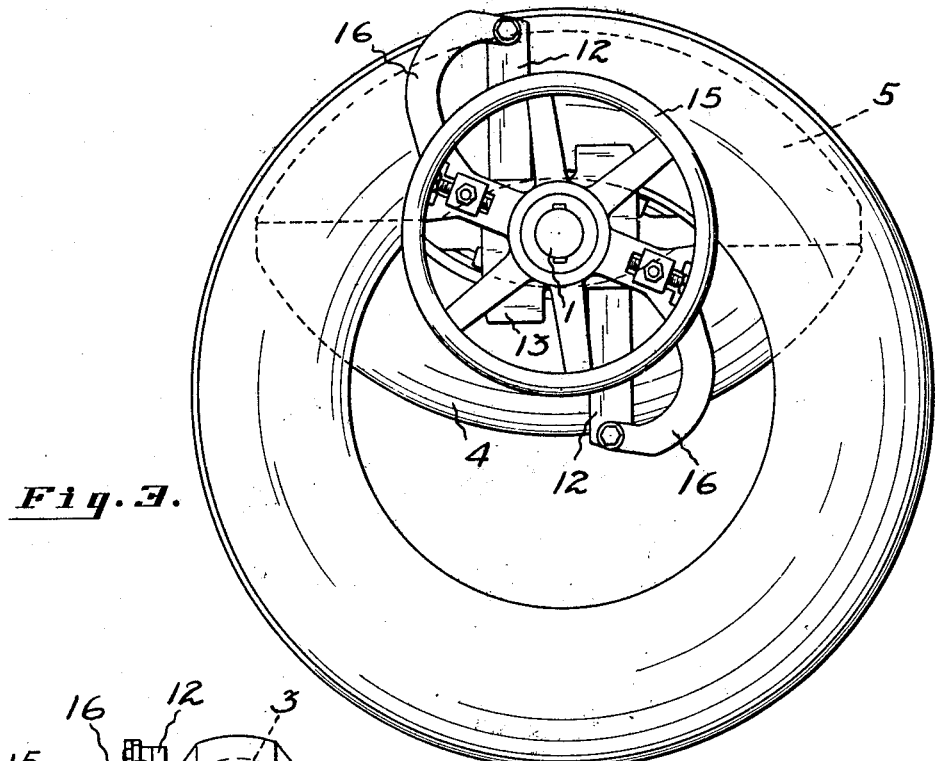
Fig. 3 is a front elevation showing the core collapsed with a tire casing thereon.
Figure 4:
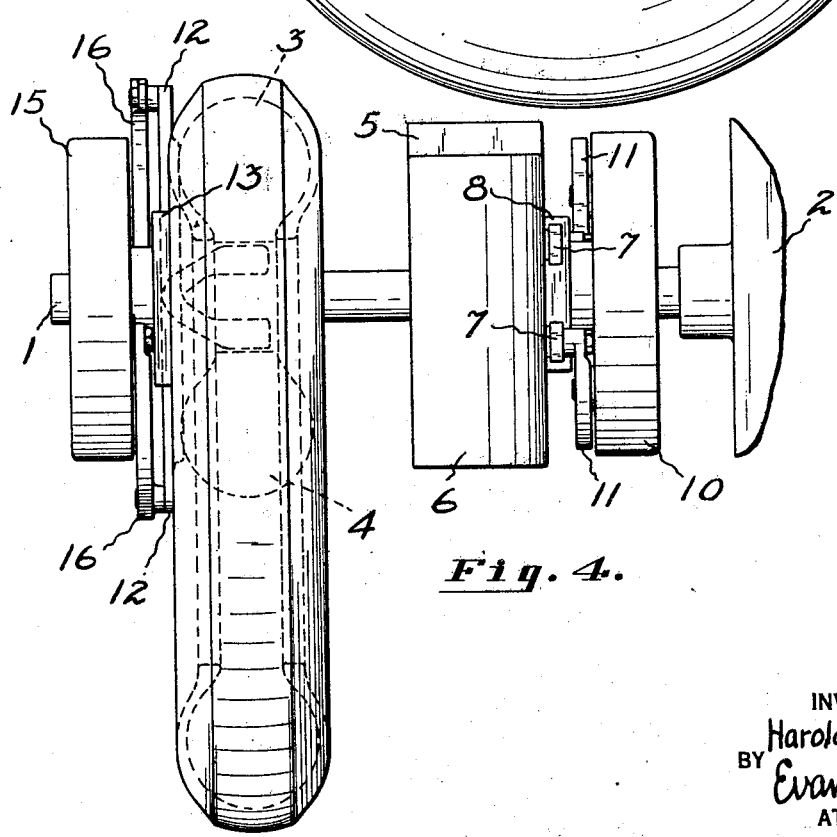
Fig. 4 is a side elevation showing the core collapsed with a tire casing thereon.

The collapsible core of the present invention is mounted upon the operating shaft 1 of a tire machine which is designated by the numeral 2 in Fig. 2. The tire machine, in so far as the present invention is concerned may be considered merely as a support for the core supporting shaft 1 which projects outwardly therefrom.

The core upon which a tire casing is built consists of a pair of oppositely disposed main sections 3 and 4 and a pair of oppositely disposed key sections 5 and 6 which are considerably shorter than sections 3 and 4 and which are so formed as to be movable into and out of position between the main sections 3 and 4 when the main sections are in their outermost positions. Key sections 5 and 6 are carried by supporting struts 7, which are connected at their outer ends to the sections 5 and 6 and at their inner ends are slidably mounted in sockets 8, carried by a sleeve 9 keyed to the shaft 1 adjacent the support 2. A handwheel 10 is rotatably mounted on the sleeve 9 and this handwheel is connected through links 11 with the struts 7 so that as the handwheel is turned in one direction, the key sections are simultaneously moved outwardly and when the handwheel is turned in the opposite direction, the key sections are simultaneously retracted to a position clear of the main core sections and of a tire mounted on the core sections. The main sections 3 and 4 are carried by supporting struts 12 which have their inner ends slidably mounted in sockets 13 carried by a sleeve 14 which is keyed to the shaft 1 outwardly of the sleeve 9. The sleeve 14 has rotatably mounted thereon a handwheel 15 which is connected by links 16 to the struts 12 to shift the main sections inwardly or outwardly with respect to the shaft. In order to position the main sections clear of the key sections, so that they can be collapsed, it is necessary that one of the collapsible supports for the core sections be mounted for movement longitudinally of the shaft 1. As shown herein, the sleeve 14 from which the main sections of the core are supported, is slidably mounted on the shaft 1 so that by pulling outwardly on the handwheel 15, the main core sections with a tire casing thereon may be moved outwardly to a position adjacent the outer end of the shaft, the outward movement of the main core sections with the tire thereon positioning the main core sections entirely clear of the key sections 5 and 6 so that the main sections may be collapsed by turning the handwheel 15. When the main sections of the core are so collapsed, the tire casing is supported upon the upper of the main core sections in a position closely adjacent the end of the shaft where it is convenient for the operator to grasp the tire casing and strip it off the main core section, the tire casing being entirely free as soon as it is detached from the main core section. After the tire casing is removed, the handwheel 15 is turned to move the main sections to their outermost positions and the main sections are then moved inwardly into alinement with the key sections 5 and 6 by pushing on the handwheel 15, whereupon the key sections are moved outwardly into position between the main sections by turning the handwheel 10 and the core is then ready to have a second casing built up thereon.

It will be apparent that the present invention provides a tire building core which may be quickly and easily assembled for reception of a tire casing and which permits the finished casing to be quickly and easily removed.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The combination with a support, of a shaft projecting outwardly from said support, and an annular tire core composed of collapsibly mounted main and key sections, said main and key sections being independently mounted on said shaft and relatively movable longitudinally of the shaft to position the main sections clear of the key sections to permit collapse of the main sections, said main sections being supported on said shaft outwardly of said key sections whereby a tire supported on the main sections may be directly removed from said main sections over the outer end of said shaft.

2. The combination with a support, of a shaft projecting outwardly from said support, and an annular tire core composed of collapsibly mounted main and key sections being independently mounted on said shaft and relatively movable longitudinally of the shaft to position the main sections clear of the key sections to permit collapse of the main sections, said main sections being slidably supported on said shaft outwardly of the key sections.

3. The combination with a support, of a shaft projecting outwardly from said support, an annular tire core comprising a pair of diametrically opposite main sections and a pair of diametrically opposite key sections, means on said shaft for supporting the key sections and for collapsing the same, and means mounted on said shaft outwardly of said supporting means for supporting the main core sections and for collapsing the same, the latter supporting means being slidable on said shaft.

4. The combination with a support, of a shaft projecting outwardly from said support, an annular tire core comprising a pair of diametrically opposite main sections and a pair of diametrically opposite key sections, a sleeve keyed to said shaft, radially movable members carried by said sleeve and supporting said key sections, a second sleeve slidably keyed to said shaft outwardly of the first mentioned sleeve, radially movable members carried by the second sleeve and supporting said main sections, and handwheels rotatable on said shaft and connected to said supporting members for actuating the same.

5. The combination with a support, of a shaft projecting outwardly from said support, an annular tire core comprising a pair of diametrically opposite main sections, and a pair of diametrically opposite key sections, a sleeve keyed to said shaft, radially movable members carried by said sleeve and supporting said key sections, a second sleeve slidably keyed to said shaft outwardly of the first mentioned sleeve, radially movable members carried by the second sleeve and supporting said main sections, and a handwheel rotatably mounted on each of said sleeves and operatively connected to the slidable supporting members carried thereby for actuating the same.

In testimony whereof I affix my signature.

HAROLD A. DENMIRE.